United States Patent
Son

(10) Patent No.: US 8,144,863 B2
(45) Date of Patent: Mar. 27, 2012

(54) METHOD AND APPARATUS FOR ECHO CANCELLATION

(75) Inventor: Jae-Hyeak Son, Gangnam-gu (KR)

(73) Assignee: Dongbu HiTek Co., Ltd., Seoul (KR)

( * ) Notice: Subject to any disclaimer, the term of this patent is extended or adjusted under 35 U.S.C. 154(b) by 980 days.

(21) Appl. No.: 12/124,625

(22) Filed: May 21, 2008

(65) Prior Publication Data

US 2008/0292093 A1    Nov. 27, 2008

(30) Foreign Application Priority Data

May 22, 2007   (KR) .................. 10-2007-0049501

(51) Int. Cl.
    *H04M 9/08*    (2006.01)
(52) U.S. Cl. ......... 379/406.12; 379/406.05; 379/406.09; 370/286; 704/248
(58) Field of Classification Search ........... 379/406.01–406.16; 370/286; 704/248
    See application file for complete search history.

(56) References Cited

U.S. PATENT DOCUMENTS

| | | | |
|---|---|---|---|
| 6,622,030 B1* | 9/2003 | Romesburg et al. | 455/570 |
| 6,775,653 B1* | 8/2004 | Wei | 704/248 |
| 2004/0042616 A1* | 3/2004 | Matsuo | 379/406.01 |
| 2005/0286714 A1* | 12/2005 | Tokuda | 379/406.05 |

* cited by examiner

*Primary Examiner* — Fan Tsang
*Assistant Examiner* — Ibraham Sharifzada
(74) *Attorney, Agent, or Firm* — Sherr & Vaughn, PLLC

(57) ABSTRACT

A technique of echo cancellation in a communication system. A method and/or apparatus of echo cancellation that may be suitable for performing echo cancellation under single talk and double talk conditions. A method and/or apparatus of echo cancellation that may significantly reduce a residual echo in a single talk environment (e.g. present in many telecommunications systems) without distorting a near end signal in a double talk environment. A method and/or apparatus of echo cancellation that may reduce a residual echo in single talk and double talk environments by applying a post-processing technique to an ECLMS algorithm.

19 Claims, 5 Drawing Sheets

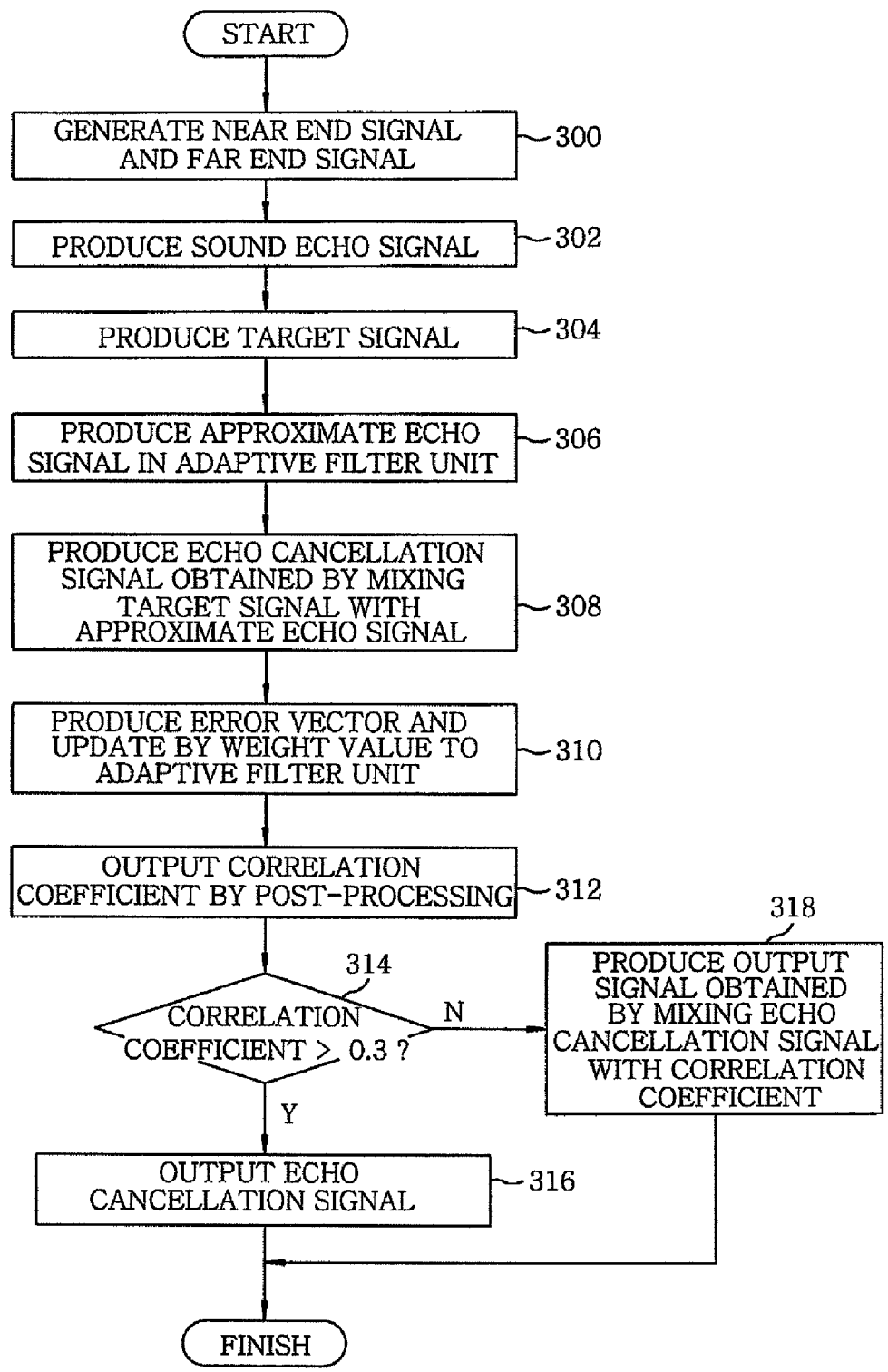

Figure 1:
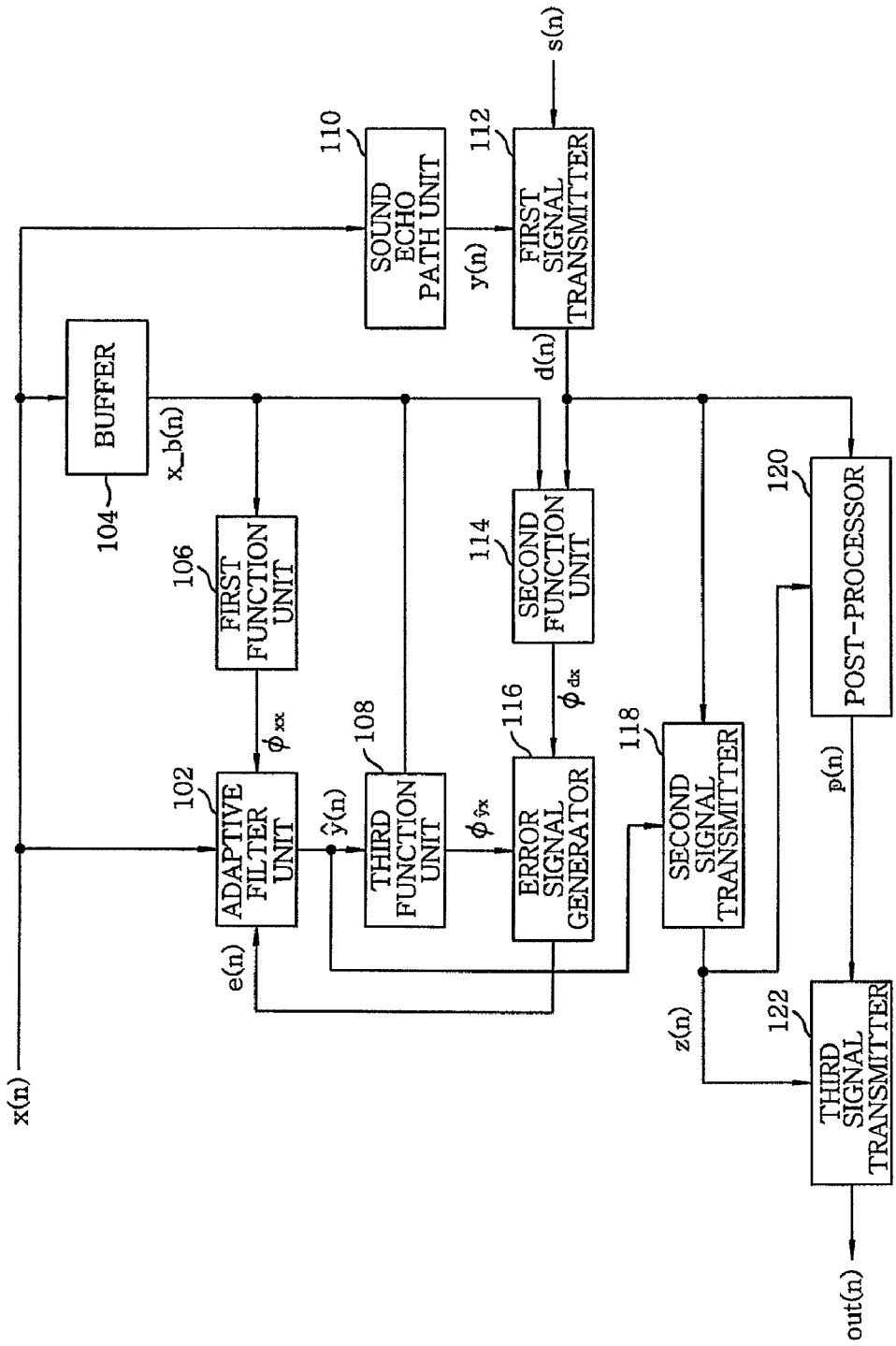

FIG.4A
< SINGLE TALK ENVIRONMENT >
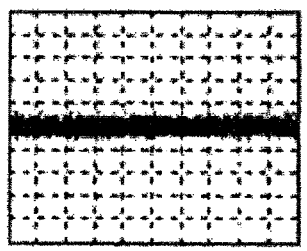 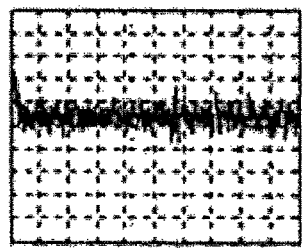 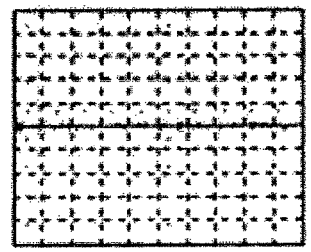
(400)　　　　　　　(402)　　　　　　　(404)
< DOUBLE TALK ENVIRONMENT >
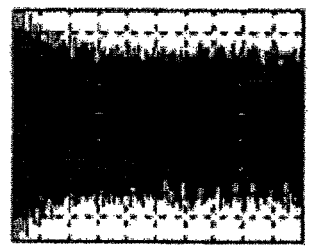 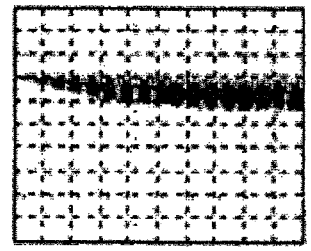 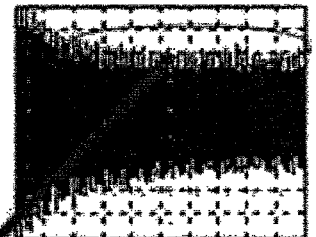
(406)　　　　　　　(408)　　　　　　　(410)
(412)

FIG. 4B
< SINGLE TALK ENVIRONMENT >
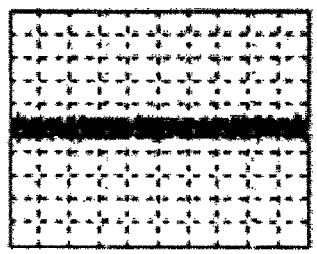 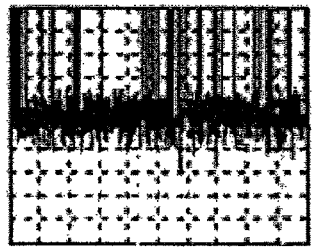 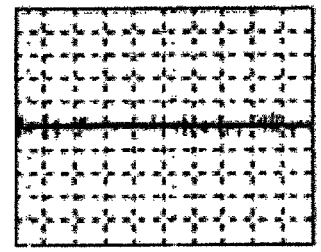
(450)  (452)  (454)
< DOUBLE TALK ENVIRONMENT >
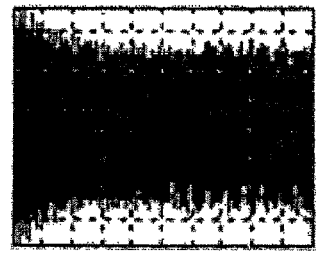 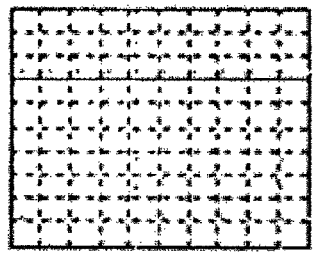 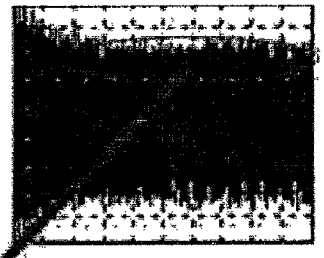
(456)  (458)  (460)
(462)

METHOD AND APPARATUS FOR ECHO CANCELLATION

The present application claims priority under 35 U.S.C. 119 and 35 U.S.C. 365 to Korean Patent Application No. 10-2007-0049501 (filed on May 22, 2007), which is hereby incorporated by reference in its entirety.

BACKGROUND

In electrical communication systems, signal loss may be overcome by transmitting signals with a large amplitude. As signal loss problems have been compensated by different technological advancements, different solutions have focused on minimizing and/or eliminating noise and/or interference. In some applications, noise and/or interference may be minimized by high quality optical fiber communication techniques. With the development of mobile communications and the increase in demand for mobile communications, mobile phones have become commonplace. Further, with the rapid development of the Internet, a demand has developed for internet phones using VOIP (Voice over Internet Protocol) and messenger (voice) communications using personal computers.

In voice communications in both telephone networks and the Internet, telephone networks and internet networks may be linked together. In such links, however, an echo may be generated, and the generated echo may degrade the quality of communication. It may be expected that next-generation communication networks will coexist with the existing communication networks due to relatively high investment costs in establishing and maintaining communication networks. Echo cancellation factors may be a persistent issue in a telephone line that links next generation communication networks and existing communication networks. Accordingly, solutions need to be implemented that compensates for echo cancellation.

One echo cancellation factor is an echo that is generated during a telephone call. A telephone call may be placed between a subscriber of a general telephone network and an exchanger in a two wire bidirectional transmission method. A telephone path may be constructed in a transmission network between exchange offices in a four wire digital transmission method. A hybrid circuit may be used which is a matching circuit for performing conversions between a two wire transmission line and a four wire transmission line. However, an echo may be generated in the hybrid circuit by factors such as impedance mismatching. Such an echo may be a far echo and control of a far echo may improve telephone call quality.

To control an echo in a telephone communication network more efficiently, an echo signal may be precisely modeled. Characteristics of an echo path may be precisely estimated and hence an echo canceller (e.g. including an adaptive filter) may be employed. A representative algorithm used in an adaptive filter may include a least mean square (hereinafter, LMS) algorithm. An LMS algorithm may have the advantages of simplicity in computation for coefficient correction, being easily induced by a gradient tracking method, and ease in hardware implementation. Accordingly, the study of echo cancellation is often focused on using an adaptive filter employing an LMS algorithm as a controller.

In a double talk environment having a near end speaker signal $s(n)$, the near end speaker signal may function as a barrier element in the coefficient adaptation of the adaptive filter, and its amplitude may be larger than that of an echo signal $y(n)$. Thus, if the adaptation of filter coefficients continues in an interval where the near end speaker is present, an error signal may become relatively large, thereby causing the echo canceller employing a general LMS algorithm to diverge.

In order to compensate for this problem, a method may employ an adaptive algorithm in an echo canceller, while additionally using a double talk detector. In this method, when the detector detects double talk, the echo canceller stops adaptation and does not perform coefficient estimation anymore.

An echo cancellation method may perform sound echo cancellation in a double talk environment using an ECMLS (Expand Correlation LMS) algorithm that normally performs the estimation of an echo even in a double talk environment and has a simple structure. However, there are challenges to this method due to generation of a residual echo because the sound echo canceller using an adaptive filter cannot sufficiently estimate a sound echo path.

SUMMARY

Embodiments relate to a technique of echo cancellation in a communication system. In embodiments, a method and/or apparatus of echo cancellation may be suitable for performing echo cancellation under single talk and double talk conditions. In embodiments, a method and/or apparatus of echo cancellation may significantly reduce a residual echo in a single talk environment (e.g. present in many telecommunications systems) without distorting a near end signal in a double talk environment. In embodiments, a method and/or apparatus of echo cancellation may reduce a residual echo in single talk and double talk environments by applying a post-processing technique to an ECLMS algorithm.

In embodiments, a method of echo cancellation may include at least one of: Producing a target signal by mixing an echo signal produced by passing a far end signal through a sound echo path with a near end signal. Producing an echo cancellation signal by receiving the near end signal and signals produced by correlation functioning from an adaptive filter. Producing an echo cancellation signal by mixing the produced target signal with an approximate echo signal. Outputting a correlation coefficient by applying a post-processing coefficient to the produced echo cancellation signal. Multiplying the echo cancellation signal by the correlation coefficient.

In accordance with embodiments, an apparatus configured to perform echo cancellation may include at least one of: A first signal transmitter configured to mix an echo signal corresponding to a far end signal with a near end signal and outputting a resultant target signal. A first function unit configured to output a signal corresponding to a correlation function of the far end signal. A second function unit configured to output a signal corresponding to a correlation function between the target signal and the far end signal. A third function unit configured to output a signal corresponding to a correlation function between an approximate echo signal and the far end signal. An adaptive filter unit configured to approximate the echo signal in accordance with the output signals from the first function unit and an error signal generator and generate a resultant approximate echo signal. A second signal transmitter configured to mix the target signal output from the first signal transmitter with the approximate echo signal and transmit a signal in which an echo is cancelled from the target signal. A post-processor configured to post-process the output signals from the first and second transmitters and output a resultant correlation coefficient. A third signal transmitter configured to multiply the near end signal output from the second signal transmitter by the correlation coefficient output from the post-processor.

DRAWINGS

Example FIG. 1 illustrates a block diagram of a structure of an echo cancellation apparatus employing a post-processing technique, in accordance with embodiments.

Figure 2:
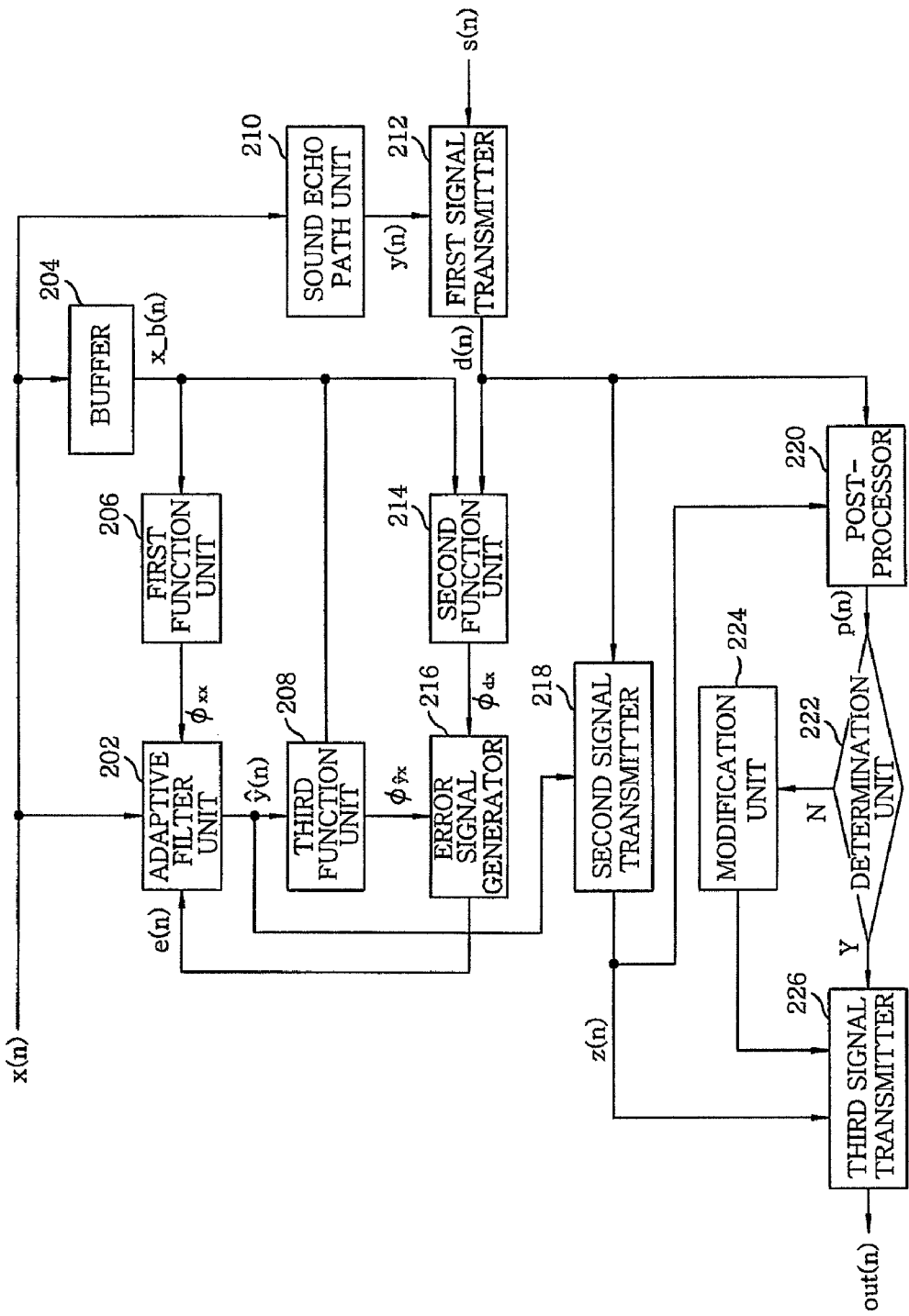

Example FIG. 2 illustrates a block diagram of a structure of an echo cancellation apparatus employing a post-processing technique, in accordance with embodiments.

Example FIG. 3 illustrates a flow chart of an echo cancellation procedure, in accordance with embodiments.

Example FIG. 4a to 4b illustrates graphs of an example result of echo cancellation, in accordance with embodiments.

DESCRIPTION

Example FIG. 1 illustrates a block diagram of a structure of an echo cancellation apparatus employing a post-processing technique, in accordance with embodiments. An echo cancellation apparatus may employ a P-ECLMS (Post-Processing ECLMS) algorithm to post-process an output echo cancellation signal z(n). An echo cancellation apparatus may include adaptive filter unit 102, buffer 104, first function unit 106, third function unit 108, sound echo path unit 110, first signal transmitter 112, post-processor 120, and/or third signal transmitter 122.

First signal transmitter 112 may receive the input of both echo signal y(n) and near end signal s(n). Echo signal y(n) may be output by passing a far end signal x(n) through sound echo path unit 110. First transmitter 112 may output target signal d(n) by mixing s(n) and y(n) (e.g. d(n)=s(n)+y(n)). In order to prevent the amplitude of the input far end signal x(n) from being changed during transmission, buffer 104 may buffer far end signal x(n) to generate output signal x_b(n). Output signal x_b(n) may be input into first function unit 106 and second function unit 114.

Passing far end signal x(n) through buffer 104 may contribute to the generation of a precise approximate echo signal ŷ(n) because when the amplitude of the far end signal x(n) changes during transmission, the generation of a precise approximate echo signal ŷ(n) of the echo signal y(n) mixed with the near end signal s(n) may not be achieved. First function unit 106 may output signal Φxx(n) from input signal x_b(n). Output signal Φxx(n) may correspond be a result of a correlation function applied to input signal x_b(n). Output signal Φxx(n) may be input into adaptive filter unit 102. Second function unit 114 may output signal Φdx(n) to error signal generator 116. Signal Φdx(n) may be a correlation function between the far end signal x(n) (e.g. as input signal x_b(n)) and the target signal d(n). In accordance with embodiments, first function unit 106 outputs input signal x_b(n) as signal Φxx(n) corresponding to its correlation function into adaptive filter unit 102 and second function unit 114 outputs signal Φdx(n) corresponding to the correlation function between far end signal x(n) (as x_b(n)) and target signal d(n) into error signal generator 116.

Adaptive filter unit 102 may receive signal Φxx(n) input from the first function unit 106 and receive far end signal x(n) and performs filtering, thus generating and outputting an approximate echo signal ŷ(n). Approximate echo signal ŷ(n) may be an approximate value of the echo signal y(n) corresponding to far end signal x(n). Third function unit 108 may output signal Φŷx(n), which may be the result of a correlation function between the output approximate echo signal y(n) and the buffered far end signal x_b(n).

Error signal generator 116 may generate error signal e(n) from signals Φdx(n) and Φŷx(n) outputted from the second function unit 114 and third function unit 108, respectively. Error signal e(n) may be input into adaptive filter unit 102. Adaptive filter unit 102 may change a coefficient of a FIR filter after error correction by an ECLMS algorithm by updating the output error signal by a weight value vector.

Second signal transmitter 118 may output an echo cancellation signal z(n) in which the echo signal y(n) is cancelled in accordance with the target signal d(n) and the approximate echo signal ŷ(n). Post-processor 120 may receive echo cancellation signal z(n) and target signal d(n) to generate a correlation coefficient p(n). Third signal transmitter 122 may reduce a residual echo by multiplying the echo cancellation signal z(n) by the output correlation coefficient p(n).

The adaptive filter unit 102 may use an ECLMS algorithm and may generate an approximate echo signal ŷ(n) to be applied to target signal d(n), where target signal d(n) is echo signal y(n) mixed with the near end signal s(n). Approximate echo signal ŷ(n) may be generated with the input of output signal Φxx(n) from first function unit 106. Third function unit 108 may output a signal Φŷx(n) corresponding to the approximate echo signal ŷ(n) and the far end signal x(n) (e.g. as x_b(n)).

Error signal generator 116 may mix output signal Φŷx(n) from third function unit 108 with the output signal Φdx(n) from second function unit 114 to generate an error signal e(n). Error signal e(n) may be re-inputted as a weight value vector to adaptive filter 102, thereby adjusting the approximate echo signal ŷ(n).

Error signal e(n) may be obtained by e(n)=Φdx(n)-Φŷx(n). The approximate echo signal ŷ(n) may be adjusted by error signal e(n). The approximate echo signal ŷ(n) may be mixed with target signal d(n) in second signal transmitter 118. As the approximate echo signal ŷ(n) and the target signal d(n) are mixed, an echo cancellation signal z(n) is generated. In echo cancellation signal z(n), echo signal y(n) is cancelled from the target signal d(n). In other words, z(n) d(n)+ŷ(n), where d(n) =s(n)+y(n), in accordance with embodiments. Accordingly, z(n)=s(n)+y(n)+ŷ(n), in accordance with embodiments. ŷ(n) may be a signal whose phase is opposite to y(n) and has the same amplitude as y(n). Accordingly, only the near end signal s(n) from which an acoustic echo is cancelled may be present in the echo cancellation signal z(n).

Accordingly, a speech quality in a single talk environment may be improved. However, in some situations, the structure illustrated in FIG. 1 may result in z(n) not matching correctly with the near end signal s(n) in a double talk environment. This may be because noise source v(n) is present and the amplitude of the echo signal y(n) is not sufficiently smaller than the near end signal. In the worst case, the far end signal forms an echo without delay by a hybrid system, whereupon the amplitude attenuation is 1.4 dB. Accordingly, if a near end signal is present, the difference between the far end signal and the near end signal is not more than 20 dB in most cases. The precondition of the post-processing algorithm is that the far end signal should be smaller than the near end signal by more than 20 dB, and this condition is satisfied in most speech conditions.

In a single talk environment (present in many telephone calls), d(n) equals y(n) because there is no near end signal s(n). Therefore, may ŷ(n) equal to y(n) only if a sound echo path estimated by an adaptive algorithm is correctly matched, and hence a correlation coefficient using post-processing becomes 1, thus having no affect to an output signal. However, it may be challenging for an algorithm to predict a sound echo path 100% correctly. This may be especially true if an actual sound echo path and an estimated sound echo path do not match with each other until the adaptive algorithm converges, thus resulting in a residual echo being generated. Accordingly, a correlation coefficient of post-processing may be smaller than 1 because the signals are different from each other and thereafter z(n) may be multiplied by a processing coefficient to reduce the residual echo.

Output echo cancellation signal z(n) may be input into the post-processor 120. As a part of figuring out the similarity of the signals, the post-processor 220 may obtain and output a correlation coefficient ({z(n), d(n) correlation function}/({d(n), d(n) correlation function}) p(n) of d(n)=s(n)+y(n) consisting of the sum of the echo cancellation signal z(n), near end signal s(n), and echo signal y(n) obtained by passing the far end signal x(n) through a hybrid transmission path (sound echo path). Output correlation coefficient p(n) may be input into third signal transmitter 122. Third signal transmitter 122 may multiply echo cancellation signal z(n) by the correlation coefficient p(n) to reduce the residual echo.

In an echo cancellation apparatus using a P-ECLMS algorithm in accordance with embodiments, if post-processor 120 applies a correlation coefficient as a post-processing coefficient to echo cancellation signal z(n), the performance is significantly improved in a single talk environment where only the far end signal x(n) is present, when the definition is not close to p(n)=1 obtained by post-processor 120 in a double talk environment where the near end signal s(n) is present. Accordingly, although echo cancellation performance in a double talk environment may be improved from a ECLMS algorithm echo cancellation apparatus, the near end signal s(n) may be distorted to a certain degree by the value of p(n).

FIG. 2 is a block diagram illustrating a structure of an echo cancellation apparatus employing a post-processing technique, in accordance with embodiments. An echo cancellation apparatus may solve and/or minimize the problem of distortion of the near end signal s(n), in accordance with embodiments.

In embodiments, an echo cancellation apparatus illustrated in FIG. 2 employs a SP-ECLMS (Selective Post-Processing ECLMS) algorithm which may differentiate a post-processing coefficient in single talk and double talk conditions. The echo cancellation apparatus illustrated in FIG. 2 has a configuration similar to the echo cancellation apparatus illustrated in FIG. 1. For example, the adaptive filter unit 102, buffer 104, first function unit 106, third function unit 108, sound echo path unit 110, first signal transmitter 112, post-processor 120, and third signal transmitter 122 illustrated in FIG. 1. may perform the same or similar functions as an adaptive filter unit 202, buffer 204, first function unit 206, third function unit 208, sound echo path unit 210, first signal transmitter 212, second function unit 214, error signal generator 216, second signal transmitter 218, post-processor 220, and third signal transmitter 226 of the echo cancellation apparatus illustrated in FIG. 2.

However, the echo cancellation apparatus using an SP-ECLMS algorithm illustrated in FIG. 2 may further include a determination unit 222 and a modification unit 224. Determination unit 222 may determine an output signal from post-processor 220. A modification unit 224 may modify a signal output from determination unit 222, thereby increasing the echo cancellation performance in a double talk environment.

In embodiments, in the echo cancellation apparatus illustrated in FIG. 2, a near end signal s(n) and an echo signal y(n) may be input into first signal transmitter 212 to output a target signal d(n).

First function unit 206 may output a signal Φxx(n) corresponding to the correlation function of the far end signal x(n) (e.g. as x_b(n)) and when output signal Φxx(n) is input into adaptive filter unit 202, the adaptive filter unit 202 may generate and output an approximate echo signal y(n). Second function unit 214 may output a signal Φdx(n) corresponding to the correlation function between the target signal d(n) and the far end signal x(n). Third function unit 208 may output a signal Φŷx(n) corresponding to the correlation function between the far end signal x(n) (e.g. as x_b(n)) and the approximate echo signal ŷ(n).

In embodiments, when the signal Φdx(n) is output from the second function unit 214 and signal Φŷx(n) is output from third function unit 208, Φdx(n) and Φŷx(n) may be input into error signal generator 216. Error signal generator 216 may generate an error signal e(n). Error signal e(n) may be re-inputted into the adaptive filter unit 202, which may reduce error in approximate echo signal ŷ(n).

Approximate echo signal ŷ(n) may be input into the second signal transmitter 218 along with the target signal d(n). In embodiments, when echo signal y(n) is cancelled from the target signal d(n) by the approximate echo signal ŷ(n), second signal transmitter 218 may output a signal z(n) corresponding to the near end signal s(n) input through first signal transmitter 212. Output echo cancellation signal z(n) and target signal d(n) may be input into post-processor 220 and correlated to output a correlation coefficient p(n). A correlation coefficient may include the sum of echo cancellation signal z(n), near end signal s(n), and echo signal y(n), which may be obtained by passing far end signal x(n) through a hybrid transmission path (e.g. sound echo path).

Determination unit 222 may determine whether the output correlation coefficient is less or more than a preset threshold value. If an input correlation coefficient is greater than or same as 0.3, this may indicate a double talk condition. If determination unit 222 indicates a double talk condition, in order to maintain the existing echo signal, the modification unit may change the correlation coefficient p(n) to 1 and output it to third signal transmitter 226, thereby preventing the distortion of the near end signal in advance. If the correlation coefficient is smaller than 0.3, this may indicate a single talk condition. If determination unit 222 indicated a single talk condition, the echo cancellation signal z(n) may be multiplied by a post-processing coefficient p(n) (e.g. the correlation coefficient), which may reduce residual echo.

One of ordinary skill in the art may appreciate other thresholds for the correlation coefficient. In embodiments, the correlation coefficient may not be fixed to a value of 0.3, but may be variable according to the path of a communication line and changeable according to a minimum attenuation ratio over a certain communication line.

Example FIG. 3 is a flow chart illustrating an echo cancellation procedure, in accordance with embodiments. A near end signal x(n) and a far end signal s(n) may be generated in step 300. An echo signal y(n) may be produced by passing the far end signal through sound echo path unit 210 in step 203. A target signal d(n) may be produced by mixing the near end signal input into first signal transmitter 212 with the echo signal in step 304.

In step 306, an approximate echo cancellation signal may be produced from a correlation function at adaptive filter unit 202 from near end signal x(n) and output signal Φxx(n). In step 308, an echo cancellation signal z(n) may be produced from a target signal and an approximate echo signal ŷ(n) at second signal transmitter 218, thus mixing these signals.

In step 310, error signal generator 216 may produce (from a correlation function) an error vector e(n). Error vector e(n)

may be produced from signal Φdx(n) output from the second function unit 214 and signal Φŷx(n) output from third function unit 208. Error signal generator 216 may perform an update to correct an error by transmitting the produced vector as a weight value to the adaptive filter unit 202. In step 312, post-processor 220 may receive echo cancellation signal z(n) and target signal d(n) and output a correlation coefficient as a post-processing coefficient.

In step 314, a determination may be made as to whether the output correlation coefficient is greater than 0.3 or not. If the correlation coefficient is greater than or equal to 0.3, this may indicates a double talk condition. If a double talk condition is indicated, the routine proceeds to step 316 to maintain the existing output signal, thereby preventing a signal distortion in a double talk in advance. If, in step 314, the correlation coefficient is determined to be less than 0.3, this may indicate a single talk condition. If a single talk condition is indicated, the routine may proceed to step 318 to produce an output signal obtained by mixing the echo cancellation signal with the correlation coefficient, thereby reducing unnecessary residual echo.

Example FIGS. 4a and 4b are graphs illustrating an example result of echo cancellation, in accordance with embodiments. FIG. 4a illustrates a graph of a signal form in single talk and double talk environments according to the embodiments illustrated in FIG. 1. Graphs 400 and 406 represent an echo cancellation signal z(n) output from the second signal transmitter 118. Graphs 402 and 408 represent signals p(n) post-processed by the post-processor 120. Signal out(n) shown in graphs 404 and 410 may be produced by mixing the z(n) and p(n) signals in the third signal transmitter 122. As illustrated, in a single talk environment, a residual echo signal may be significantly reduced as shown in graph 404, in accordance with embodiments. However, as illustrated, in a double talk environment, the near end signal may be distorted, as shown in 412 of graph 410.

FIG. 4b illustrates a graph of a signal form in single talk and double talk environments, in accordance with embodiments illustrated in example FIG. 2. Graphs 450 and 456 represent an echo cancellation signal output from second signal transmitter 218. Graphs 452 and 458 represent signals post-processed by the post-processor 220. Signal out(n) shown in graphs 454 and 460, illustrated mixing signals z(n) and p(n) in third signal transmitter 122. As illustrated, in a single talk environment, although a residual echo signal is reduced as seen in the graph 454, FIG. 4a shows a greater residual echo cancellation ability. However, in a double talk environment, a distortion phenomenon may be solved as illustrated in 462 of the graph 460. Thus, while the configuration of the echo cancellation apparatus using embodiments illustrated in FIG. 1 may exert a large effect in an environment where a single talk is more frequent, the configuration of the echo cancellation apparatus using embodiments illustrated in FIG. 2 can exert a large effect in an environment where both single and double talks frequently occurs or a double talk is more frequent.

Embodiments may reduce a residual echo in a single talk environment (present in may telephone calls) without distorting a near end signal in a double talk environment by employing a post-processing technique. In embodiments, a residual echo may be reduced in a single talk environment without distorting a near end signal in a double talk environment, and can perform real-time processing because the additional computational requirements of an algorithm may be minimal.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method comprising:
generating a near end signal and a far end signal;
generating an echo signal from the far end signal;
generating a target signal by mixing the echo signal and the near end signal;
generating an approximate echo signal from the far end signal, a correlated buffered far end signal, and an error signal between a first signal and a second signal, wherein the first signal corresponds to a correlation function between the far end signal and the target signal, and the second signal corresponds to a correlation function between the far end signal and the approximate echo signal;
generating an echo cancellation signal by mixing the approximate echo signal and the target signal; and
applying a correlation coefficient to the echo cancellation signal.

2. The method of claim 1, wherein the correlation coefficient is generated from the target signal and the echo cancellation signal.

3. The method of claim 2, wherein the method employs a post processing expand correlation least mean squared algorithm.

4. The method of claim 2, wherein:
the correlation coefficient is set to 1 if the correlation coefficient is calculated to be greater than a predetermined value; and
the correlation coefficient is applied as calculated if the correlation coefficient is less than or equal to the predetermined value.

5. The method of claim 4, wherein the predetermined value is 0.3.

6. The method of claim 4, wherein the method employs a selective post processing expand correlation least mean squared algorithm.

7. The method of claim 1, wherein said applying the correlation coefficient to the echo cancellation signal comprises multiplying the correlation coefficient and the echo cancellation signal.

8. The method of claim 1, wherein the near end signal and the far end signal are generated from a voice signal.

9. The method of claim 1, wherein: said applying the correlation coefficient includes multiplying the echo cancellation signal and the correlation coefficient.

10. An apparatus comprising:
a sound echo path unit configured to generate an echo signal from a far end signal;
a first signal generator configured to generate a target signal by mixing the echo signal and a near end signal;
an adaptive filter unit configured to generate an approximate echo signal from the far end signal, a correlated buffered far end signal, and an error signal between a first signal and a second signal, wherein the first signal corresponds to a correlation function between the far end signal and the target signal, and the second signal corresponds to a correlation function between the far end signal and the approximate echo signal;

a second signal transmitter configured to generate an echo cancellation signal by mixing the target signal and the approximate echo signal;

a post processor configured to generate a correlation coefficient from the target signal and the echo cancellation signal;

a third signal transmitter configured to apply the correlation coefficient to the echo cancellation signal.

11. The apparatus of claim 10, wherein the apparatus is configured to process a post processing expand correlation least mean squared algorithm.

12. The apparatus of claim 10, comprising a determination unit configured to determine the post processing application of the correlation coefficient.

13. The apparatus of claim 12, wherein:

the determination unit sets the correlation coefficient to 1 if the correlation coefficient is calculated to be greater than a predetermined value; and the determination unit applies the correlation coefficient as calculated if the correlation coefficient is less than or equal to the predetermined value.

14. The apparatus of claim 13, wherein the predetermined value is 0.3.

15. The apparatus of claim 12, wherein the apparatus is configured to process a selective post processing expand correlation least mean squared algorithm.

16. The apparatus of claim 10, wherein the determination unit applies the correlation coefficient to the echo cancellation signal by multiplying the correlation coefficient and the echo cancellation signal.

17. The apparatus of claim 10, wherein the near end signal and the far end signal are generated from a voice signal.

18. The apparatus of claim 10, wherein the apparatus is comprised in a communication system.

19. The apparatus of claim 18, wherein the communication system comprises at least one of a single talk environment and a double talk environment.

* * * * *